United States Patent Office 3,634,400
Patented Jan. 11, 1972

3,634,400
CROSS-LINKABLE BIS-ETHYLENE IMINE COMPOUND
Werner Schmitt and Robert Purrmann, Starnberg, Peter Jochum, Pilsensee, and Wolf-Dietrich Zahler, Haar, near Munich, Germany, assignors to Espe Fabrik Pharmazeutischer Praparate GmbH, Seefeld, Bavaria, Germany
No Drawing. Continuation-in-part of application Ser. No. 288,538, June 17, 1963. This application July 3, 1967, Ser. No. 650,588
Claims priority, application Germany, June 20, 1962, E 23,068
Int. Cl. C07d 23/06
U.S. Cl. 260—239 E       4 Claims

ABSTRACT OF THE DISCLOSURE

The present invention relates to material for making casts for dental purposes, which material substantially comprises bis-ethylene-imine compounds capable of being cross-linked and having the formula

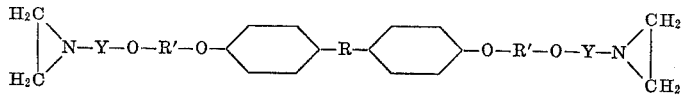

wherein R is an alkylidene radical with 1–6 carbon atoms, a cycloalkylidene radical or an $SO_2$ radical; R' an alkylene radical having 2–6 carbon atoms or a cycloalkylene radical, and Y an acyl radical of a carboxylic acid with 2–6 carbon atoms, which may also be substituted by an aromatic substituent.

---

This is a continuation-in-part of application Ser. No. 288,538, filed June 17, 1963 now abandoned.

For making dental prostheses, artificial dentures, plates and the like, it is necessary to make castings of the jaws and of existing teeth; such casts must be made of a solid mass and they must be capable of reproducing the cast parts with the utmost accuracy. The cast material should harden rapidly after being filled into the mold, but it should not be brittle, since otherwise projecting parts may be easily broken off during trying on the pieces in preparation. Another requisite property is resistance to scratching, because the try-out requires repeated insertion and removal of the pieces under preparation.

Many hardenable materials have been used up to the present for the purposes in question, among others, hard gypsum, cement, as well as substances which yield polymerization products of plastic nature, such as methylmethacrylate, or phenolic resins hardenable by mineral acids. However, all the materials used for making casts for dental purposes have considerable shortcomings. Thus hard gypsum, while hardening rapidly, is brittle in the prepared cast and only moderately resistant to abrasion. The same is true for cement.

Casts of organic materials are very desirable because of their valuable mechanical properties, namely their high resistance to abrasion and to breakage after hardening; however, for dental purposes they were hitherto not useful in practice, since they do not come up to specification as far as accuracy of reproduction is concerned; this is due to excessive shrinkage during polymerization or hardening. Shrinkage of a material during hardening of a plastic occurs in two phases, the first one being a contraction in liquid state. When the mass is poured into open molds, this contraction results in a slight drop of the level of the liquid mixture. While this first contraction does not cause a considerable impairment of the accuracy of the cast, a second contraction takes place after the material has become solid and this will cause a difference between the finished cast and the mold, which cannot be tolerated even if the deviation of the volume is only a small one. Furthermore, with some synthetic materials relatively high temperatures are reached in the mold during the polymerization process, and this is undesirable, because the molds themselves are frequently made of thermoplastic materials and are thus sensitive to heat; therefore the rise in temperature will further impair the accuracy of the resulting replica. Phenolic resins harden comparatively slowly and exhibit low final hardness, moreover, concentrated sulfuric acid has to be used in the operation, which is, of course, an important shortcoming for practical purposes.

It is, therefore, the object of the invention to provide casting materials for dental purposes which are free of the above shortcomings and which permit to make casts of highest accuracy in a simple manner, and at comparatively low costs.

It is another object to provide materials which will be abrasion-fast, resistant to scratching and to breakage; which are of great hardness, without being brittle; which will harden within comparatively short time and without noticeable shrinkage.

Other advantages and objects of the invention will become apparent from the following detailed description.

It has now been found that certain organic polyethyleneimine compounds are very valuable materials for dental purposes, more particularly for making casts, because they harden rapidly in the presence of known ethyleneimine hardening agents without showing any contraction of the volume such as exhibited by other synthetic resins, even with the similarly constituted epoxy resins.

According to the invention bis-ethylene-imine compounds are used for making dental casts, which are capable of being crosslinked becoming hardened thereby and which have the following general formula

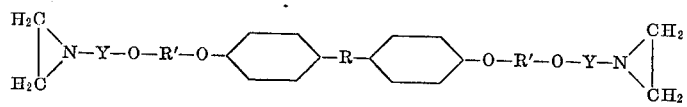

wherein R is an alkylidene radical with 1–6 carbon atoms, more particularly, isopropylidene a cycloalkylidene radical or an $SO_2$ radical; R' is an alkylene radical with 2–6 carbon atoms, more particularly, 2 or 3 carbon atoms, or a cycloalkylene radical; and Y an acyl radical of a carboxylic acid having 2–6 carbon atoms, preferably the butyryl radical substituted by an ethylene amino group. The acyl radical may also be aromatically substituted as for instance in the β-phenyl-propionic acid. The two aromatic rings may likewise carry substituents, especially halogen, lower alkyl, such as $CH_3$, or alkoxy radicals, e.g., $CH_3O$.

In order to insure sufficient strength, the amount of the bifunctional ethylene imine compounds should not be less than 50% by weight, fillers and other additives not included. In their preparation, the ethylene-imine compounds are not always obtained 100% pure, but in most cases no purification is necessary, since a small amount, for instance, up to 25% by weight in monofunctional compounds does not adversely affect the desired mechanical properties. A small addition of a preferably monofunctional ethylene imine compound in the form of a thin liquid may even be desirable for reducing the viscosity because the material can then be directly poured into the molds.

The preparation of the ethylene-imine compounds to be used in the casts, and which does not form a part of the present invention, takes place in a known manner, for instance, by reaction of halogenated carboxylic esters with ethylene-imine, whereby halogen is replaced by ethylene-imine. This process is explained, e.g., in German Pat. 858,700. Another method for preparing the ethylene-imine compounds consists of adding ethylene-imine to esters of unsaturated carboxylic acids. (See German Pat. 849,407).

A typical representative of the ethylene-imine compounds used as starting material is, for instance, one of the formula

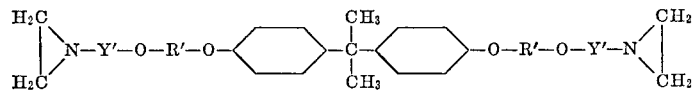

wherein R' has the above meaning and Y' is an acyl group with 2–6 carbon atoms. Such substances will have a particularly high surface hardness. It is up to three times as high as that of self-hardening polymethylmethacrylate.

As examples of typical starting materials we mention, in general, the derivatives of bis-hydroxyethyl ethers and bis-hydroxypropyl ethers of diphenols. The following diphenols may be cited for illustration:

4,4'-dihydroxy-diphenyl-1,1-ethane,
4,4'-dihydroxy-diphenyl-2,2-butane,
4,4'-dihydroxy-3,3'-dimethyldiphenyl-2,2-propane,
4,4'-dihydroxy-diphenyl-methylphenyl-methane,
4,4'-dihydroxy-diphenyl-sulfone,
4,4'-dihydroxy-diphenyl-1,1-cyclohexane.

Y in the above formula may be, for example, the acyl residue of ethyleneimino-acetic-acid,
ethyleneimino-α-propionic acid,
ethyleneimino-β-propionic acid,
α-ethyleneimino-butyric acid,
β-ethyleneimino-butyric acid,
β-ethyleneimino-valeric acid and
β-ethyleneimino-caproic acid.

The polymerization of the ethylene-imine compounds is effected in a manner known per se, e.g., by mixing with catalysts such as an alkylating agent or with an inorganic or organic acid; examples for such acids are sulfonic acids, e.g., dodecyl-benzene sulfonic acid. The acids should also include Lewis-acids, e.g., $BF_3$, or $SnCl_4$.

Very well suited are neutral sulfuric acid esters and sulfonic acid esters, particularly aromatic sulfonic acid esters, e.g., benzene and p-toluene sulfonic acid methyl esters; furthermore compounds having a reactive halogen atom, such as benzyl bromide, also sultones and oxonium salts. Particulary active catalysts are for instance, sulfonic acid esters with electro-negative substituents in the benzene nucleus, such as 2,5-dichloro- or 4-nitro-benzene sulfonic acid methyl ester. Inasmuch as these substances are solid, they are preferably dissolved in liquid catalyst; by mixing different catalysts practically any desired setting time, starting with a few minutes at 0° C., up to many hours, may be adjusted. On the other hand, almost any desired viscosity may be obtained by mixing different ethylene-imine compounds.

The hardening agents may either be in liquid form or in the form of pastes. The former are preferred when ethylene-imine derivatives are used which are of comparatively low viscosity while pasty hardeners are used with more viscous masses as they are obtained when fillers, for instance, fibers are incorporated. When it is desired to make a pasty mass from the mostly liquid hardening agents of low viscosity, known means may be employed, e.g., kneading—in of highly dispersed silicic acid may be practiced.

The catalyst is added, as a rule, in an amount of 0.5–10% preferably 1–5% by weight, calculated on the amount of compound to be hardened. The mixture of ethylene-imine compound and hardening catalyst is added preferably immediately after the mass is mixed for use or has been introduced into the mold by a suitable instrument. It is advantageous to adjust the setting time by means of a starter, particularly a sulfoacid methyl ester, in such a manner that cross-linking will start after a few minutes and is substantially complete after one hour, at the latest.

Since hardening can also be brought about by acids, as already mentioned, care should be taken that in case the ethylene-imine compounds contain acidic groups, e.g., from their preparation, these groups should be neutralized with basic agents, since an uncontrolled reaction might otherwise take place.

Alkaline agents, particularly tertiary amines, will act as stabilizers when used in small amounts, since cross-linking is initiated by acids and alkylating agents, which will then react preferentially with the stabilizers. In some cases, it is possible to accomplish a desirable extension of the processing time by the use of tertiary amines, preferably such amines which are not volatile or only slightly so.

The properties of the casts made according to the invention may be further modified by the addition of fillers. These may be organic fillers, particularly, in the form of fine powders, and/or inorganic, e.g. calcium carbonate, Kieselguhr and others, also by pigments and other colorants. The addition of fibrous fillers, particularly short nylon fibers, glass fibers, etc. results in the further improvement of the mechanical properties of the masses obtained therewith. This is especially the case when glass fibers are added, particularly if they have been surface-treated and amino-groups have thereby been incorporated, including ethylene-imine groups. In this manner shrinkage, which is low to begin with, is further reduced during cross-linking (hardening). Calculating from the gelling point, it will amount to 0.05–0.2% linearly, upon introduction of glass fibers, it will as a rule be decreased to less than 0.1%, and in some cases it will only be 0.01 linearly.

The fact that ethylene-imine derivatives may be hardened in the presence of acids, such as sulfuric acid, or sulfonic acid esters, to form solid, cross-linked polymers, has been known to the persons familiar with this field for a long time from German Pats. 849,407; 858,700 and 888,170.

It is further known from U.S. Pat. No. 2,626,931 that polymers of polyvalent ethylene-imine esters are physiologically indifferent and therefore, could be used as materials for artificial teeth. It should, however, be noted that the materials described in the patent exhibit too high a contraction upon setting, which prevents the application for practical dental purposes.

In order to get an idea of the requirement of accuracy which a compound of this type has to meet, the following statements should be taken into consideration:

When a dentist makes a metal substitute piece, say, for instance, an inlay, a crown or a bridge, to be used in a denture, he first has to make a negative cast or an impression, from which the positive cast is to be made. The required metal piece is then produced and adjusted on the positive. The roughness of the metal piece and of the dentine surface amounts to about 5μ and the gap for the cement with which the metal piece is later to be inserted into the denture should be 5 to 10μ. That is to say, the artificial metal piece must not deviate more than a few hundredths mm. when this work should prove satisfactory. This means that in bridgework of about 50 mm. linear lengths the linear deviation is not supposed to be above 0.1%.

Already in preparing the negative casts from the denture a change in dimension is involved, and furthermore, the production of the metal piece from the negative cast cannot be accomplished without change in volume. It is important that the linear contraction of the material, upon hardening, should lie below 0.1%.

With the above consideration in mind, tests with the compounds according to U.S. Pat. 2,626,931, were made and it was found that these compounds show linear contractions in the range of 0.5 to 0.7%.

It was very surprising to find that the bis-ethylene-imine compounds according to the invention, in spite of their similar structure, show practically no contraction during setting and hardening and are, therefore, very well suited for dental work.

It is another important advantage that the ethylene-imine compounds according to the invention exhibit a much higher stability to water as compared to the compounds disclosed in U.S. Pat. No. 2,626,931. The latter disintegrate completely after having been lying under water at a temperature of 36° C. for about 50 days. It is obvious that they cannot be used as casting materials for artificial dentures and other dental purposes, where they are in constant contact with saliva. Only materials which will remain unchanged under the conditions mentioned, can be of practical value. The compounds according to the invention have been subjected to the stability test under water for 400 days without showing the slightest change.

A number of tests carried out between conventional materials and the materials according to the invention will be given below.

Test relating to contraction upon setting

The contraction was measured as described below.

Into a metal block, a prismatic body was cut with a length of one of the triangle sides of 4 mm., and the axial length of 50 mm., in such a manner that one of the lateral planes of the prismatic body coincided with the surface of the metal block. The triangular end faces are exactly parallel, and their distance was measured optically to an accuracy of 0.01 mm.

This hollow mold is filled with the substance to be tested by pouring it into the same, and the length of the cast so made is measured with a micrometer or by optical means, and is compared with the mold.

Following another method, the material of the cast is made to harden on a plate, on which two parallel lines are made by scratching in an accurately known distance. The lines are reproduced on the cast and their distance measured by optical means.

Table showing the difference in linear contraction indicated in percent, when one of applicant's compounds is used, as compared to known compounds:
Materials:
    A. 2,2 - bis - (p - β-hydroxyethoxy-phenyl)-propane-bis-β-ethylene-imino-butyrate (compound of the invention)
    B. Bis-β-ethylene-imino butyric glycol ester (Bestian, U.S. Patent No. 2,626,931)
    C. Bis-β-ethylene-imino butyric acid-1,3-butylene ester (Bestian).

| Substance | Without filler | With filler |
|---|---|---|
| A | 0.10 | 0.01 |
| B | 0.70 | 0.30 |
| C | 0.52 | 0.24 |

"Filler" means 38% by weight glass fibers of a medium length of 0.05 mm.

The table shows that the contraction of the known compounds is at least 5 times greater, with filler even 25–30 times greater than that of the tested compound according to the invention.

Comparison with conventional molding materials

In the manner described above, the contraction of the materials upon setting was determined; further measured was the wedge-breaking strength.

This was carried out on a pressure testing machine FRANK 581: The test pieces are lifted on a steel table against a wedge at advancement of 0.12 mm. per second. The planes of the hardened wedge are at an angle of 35° with respect to each other, and the point of the wedge has a cylindrical curvature radius of 0.5 mm. Upon breakage of the piece, the pressure is read on a scale.

Tested Materials:
    A. 2,2 - bis - (p-β-hydroxyethoxy-phenyl)-propane-bis-β-ethylene-imino butyrate (compound according to the invention)
    A'. 2,2 - bis - (p-β-hydroxyethoxy-phenyl)-propane-bis-β-ethylene-imino butyrate with 38% glass fibers
    B. Conventional cement for casts
    C. Conventional cement for casts
    D. Conventional preparation on basis of phenol resin
    E. Conventional preparation on basis of polymethylmethacrylate.

| Substance | Contraction setting | Wedge-breaking strength |
|---|---|---|
| A | 0.1 | 165 |
| A¹ | 0.01 | 162 |
| B | 1.7 | 52 |
| C | 2.0 | 82 |
| D | ¹+0.2 | 25 |
| E | 0.3 | 115 |

¹ Expansion during setting.

The table shows the superior properties measured of the substance according to the invention as compared to conventional materials.

The invention will now be explained in a number of examples, but it should be understood that these are given by way of illustration and not of limitation and that many changes in the details can be made without departing from the spirit of the invention.

EXAMPLE 1

2 g. 2,2-bis-(p-β-hydroxyethoxy-phenyl)-propane-bis-β-ethylene-imino-butyrate are mixed with 80 mg. p-toluene sulfonic acid methylester and poured into a partial negative mold of a tooth. Setting begins after 5–7 minutes and is complete in 20 minutes without change in volume.

The 2,2-bis-(p-β-hydroxyethoxy-phenyl)-propane-bis-β-ethylene-imino-butyrate was obtained by adding dropwise 30.5 g. ethylene-imine to 53.5 g. 2,2-bis-(p-β-hydroxyethoxy-phenyl)-propane-bis-crotonate, whose mode of preparation is described in U.S. Pat. 2,359,622; addition occurs with stirring at 50° C. After standing for 5 days at room temperature, the excess of ethylene-imine was withdrawn in vacuo. The residue (61.3 g.) has a basic equivalent of 276 and thus contains about 97% by weight of the addition product, which may be used without further purification.

EXAMPLE 2

Into 2,2-bis-(p-β-hydroxyethoxy-phenyl)-propane-bis-α-ethylene-imino-propionate we add by stirring 1% by weight of titanium dioxide and 2% by weight of benzene sulfonic acid methyl ester which was colored yellow by a slight addition of a fat-soluble dye; the mixture is filled into a mold. Obtained are casts which are very well suited for adjustment of "jacket" crowns.

The polyethylene-imino compound used herein was obtained by adding dropwise 100 g. 2,2-bis(p-β-hydroxyethoxy-phenyl)-propane-bis-α-bromopropionate to a mixture of 73.5 g. ethylene imine, 69 g. triethylamine and 100 ml. benzene, while stirring, and maintaining the temperature by cooling at 20° C. After 15 hours standing at room temperature, the liquid was withdrawn from the bottom deposit and the liquid phase was further stirred for 48 hours at room temperature. After the usual purification and drying over potassium carbonate, benzene was finally withdrawn in a high vacuum. Obtained are 56.8 g. of a product having an amine equivalent of 250, a viscosity of about 185 poises at 25° C., and consisting substantially of 2,2-bis-(p-β-hydroxyethoxy-phenyl)-propane-bis-α-ethylene-imino-propionate.

EXAMPLE 3

1 g. 2,2-bis-(p-β-hydroxyethoxy-phenyl)-propane-bis-α-ethylene-imino-butyrate is mixed with 30 mg. benzene sulfonic acid methyl ester and the mixture is poured into a mold. Hardening sets in after about 5 minutes and is complete after about 18 minutes, whereupon the cast can be taken out.

The bis-ethylene-imine compound of this example was obtained as follows: By reacting 861 g. 2,2-bis(p-β-hydroxy-ethoxy-phenyl) propane-bis-α - bromo - butyrate with 603 g. ethylene-imine following the directions of German Patent 858,700, there resulted 572 g. of the corresponding α-ethylene-imino butyrate. The product obtained has a viscosity of about 110 poises at 25° C. and an amine equivalent of 268.

EXAMPLE 4

100 g. of the bis-ethylene-imine compound used in Example 2 are kneaded together with 25 g. glass fibers of the mean length of 0.1 mm. By mixing with 3% by weight of methoxybenzene sulfonic acid methyl ester and filling into molds, casts of highest precision and hardness are obtained in a few minutes.

EXAMPLE 5

To 100 g. of the bis-ethylene-imine compound used in Example 2, 12 g. of short cut nylon fibers are added and worked into the mass. After mixing thereto 2% by weight of p-toluene-sulfonic acid methyl ester, the mass is suitable for making casts which have excellent mechanical properties.

EXAMPLE 6

Into a mixture of 9 parts of the bis-ethylene-imine compound of Example 3, and 1 part of ethylene-imino succinic acid-dimethyl ester we incorporate 3% by weight of p-toluene-sulfonic acid methyl ester. The thin liquid is poured into a mold and hardens within 20 minutes.

EXAMPLE 7

1 g. of the ethylene-imine compound of Example 3 are mixed with 40 mg. of the complex compound of $BF_3$–N, N-dimethyl-acetamide. Crosslinking starts very soon and leads in a few minutes to a very hard product.

EXAMPLE 8

30 g. bis - (p-β-hydroxyethoxy-phenyl)-sulfonebis-β'-ethylene-imino-butyrate are mixed with 1.5 g. benzene sulfonic acid methyl ester. Hardening of the material immediately poured into the mold sets in after a short while and leads in a few minutes to a cast which is as clear as glass and exhibits high strength.

The bis-alkylene imine compound used was prepared by making bis-(p-β-hydroxy ethoxy-phenyl)-sulfone-bis-crotonate in the usual manner by esterification of bis-(p-β-hydroxy-ethoxy-phenyl)-sulfone with crotonic acid in the presence of p-toluene-sulfonic acid. Melting point after recrystallization from methanol 125° C. 36 g. of this substance were then introduced while stirring into a mixture of 19 g. ethylene-imine and 0.03 g. tributyl amine, at 50° C. After standing for 4 days at room temperature, the excess ethylene imine was stripped, in the last stage at high vacuum. The oily residue has a basic equivalent of 268.

While we have described a number of compounds useful for making casts for dental purposes and similar articles, it should be understood that many more compounds than those set forth specifically can be used without departing from the scope of this invention.

Instead of the sulfonic acid ester of Example 8 other sulfonic acid esters or dialkyl sulfates, e.g. m-chloro-benzene-sulfonic acid ethyl ester, p-toluene-sulfonic acid allyl ester, diethyl sulfate, or methyl-lauryl-sulfate, may be used.

What is claimed is:

1. A bis-ethylene-imine compound capable of being cross-linked and having the formula

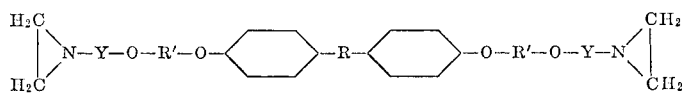

wherein R is an alkylidene radical having 2–4 carbon atoms, cyclohexylidene radical, dimethylene phenyl radical or $SO_2$ radical, R' is an alkylene radical having 2 or 3 carbon atoms, and Y is an alkanoyl having 2–6 carbon atoms.

2. A compound according to claim 1, in which R is 2,2-propylidene radical.

3. 2,2 - bis-(p-β-hydroxyethoxy-phenyl)-propane-bis-β-ethylene-imino-butyrate.

4. 2,2 - bis - (p-β-hydroxyethoxy-phenyl)-propane-bis-α-ethylene-imino-propionate.

References Cited

UNITED STATES PATENTS

| | | | |
|---|---|---|---|
| 2,596,200 | 5/1952 | Bestian | 260—239 |
| 3,169,122 | 2/1965 | Hennes | 260—239 |

ALTON D. ROLLINS, Primary Examiner

U.S. Cl. X.R.

106—35, 38.2; 260—2 EN, 37 N

UNITED STATES PATENT OFFICE
CERTIFICATE OF CORRECTION

Patent No. 3,634,400            Dated    January 11, 1972

Inventor(s) WERNER SCHMITT, ROBERT PURRMANN, PETER JOCHUM, and WOLF-DIETRICH ZAHLER It is certified that error appears in the above-identified patent and that said Letters Patent are hereby corrected as shown below:

Column 8, line 49, delete "dimethylene phenyl"

and insert -- methyl phenyl methylene --.

Signed and sealed this 7th day of November 1972.

(SEAL)
Attest:

EDWARD M. FLETCHER, JR.                 ROBERT GOTTSCHALK
Attesting Officer                       Commissioner of Patents